United States Patent [19]

Giencke et al.

[11] Patent Number: 5,545,678
[45] Date of Patent: Aug. 13, 1996

[54] POLYMER SYSTEMS, PROCESS FOR THEIR PREPARATION, AND THEIR USE FOR PRINTING INKS

[75] Inventors: Astrid Giencke, Hofheim; Uwe Neumann, Bad Schwalbach; Bernd Mergardt, Eltville; Gerd Walz, Wiesbaden, all of Germany

[73] Assignee: Hoechst Aktiengesellschaft, Frankfurt, Germany

[21] Appl. No.: 335,419

[22] Filed: Nov. 2, 1994

[30] Foreign Application Priority Data

Nov. 2, 1993 [DE] Germany .......................... 43 37 253.8
Jun. 30, 1994 [DE] Germany .......................... 44 22 869.4

[51] Int. Cl.⁶ .............................. C08K 3/20; C08L 63/02
[52] U.S. Cl. ......................... 523/404; 524/845; 528/120; 528/121; 528/370; 528/421
[58] Field of Search ........................... 523/404; 524/845; 528/120, 121, 370, 421

[56] References Cited

U.S. PATENT DOCUMENTS

| | | | |
|---|---|---|---|
| 3,770,544 | 11/1973 | Holt | 156/306 |
| 4,554,212 | 11/1985 | Diefenbach et al. | 428/413 |
| 4,824,927 | 4/1989 | Dobbelstein et al. | 528/88 |
| 4,871,808 | 10/1989 | Schwerzel et al. | 525/113 |
| 4,882,391 | 11/1989 | Brindoepke et al. | 525/327.2 |
| 4,885,392 | 12/1989 | Lenz et al. | 564/503 |
| 4,940,768 | 7/1990 | Hoenel et al. | 528/45 |
| 5,132,458 | 7/1992 | Hoenel et al. | 564/367 |
| 5,324,404 | 6/1994 | Ott et al. | 204/181.7 |

FOREIGN PATENT DOCUMENTS

| | | |
|---|---|---|
| 1940220 | 10/1970 | Germany . |
| 4115731 | 11/1992 | Germany . |

OTHER PUBLICATIONS

F. Lohse et al., "Epoxid–Harze", *Methods of Organic Chemistry, Georg Thieme Verlag Stuttgart*, 4th Edition, vol. E20:1890–1995, (1987).

A. M. Paquin, "Epoxide Compounds And Epoxy Resins", Springer–Verlag, Berlin (1985), pp. 256–307.

Lee et al., "Handbook of Epoxy Resins", Chapter 2, pp. 2-2-2-33 (1967).

Wagner/Sarx, "Synthetic Resins For Coatings", *Carl Hanser Verlag*, pp. 172–194, (1971).

Vaidya, "A Reactive Supernucleophilic Catalyst: II: Kinetics Of The Esterolysis of Activated Esters", vol. 2:101–103, (1986).

Ullmann's Encyclopedia of Industrial Chemistry, 4th Edition, Verlag Chemiem, Weinheim, vol. 19:132–145, (1980).

G. Poehlein, "Emvision Polymerization", Encyclopedia Of Polymer Science And Engineering, Wiley & Sons, New York, vol. 6:1–51, (1986).

*Primary Examiner*—Melvyn I. Marquis
*Assistant Examiner*—D. Aylward
*Attorney, Agent, or Firm*—Foley & Lardner

[57] ABSTRACT

Amino-containing polymer systems which are suitable for the preparation of binders for printing inks can be obtained by synthesizing a polymer or polymer mixture A from at least one compound from each of the groups (a) epoxides, carbonates, epoxide-carbonates,
(b) amines and
(c) phenols, at least partial neutralization of the resulting polymer or polymer mixture A, and transfer to water, and optionally, preparing a water-insoluble polymer B which can be prepared by polymerization of ethylenically unsaturated monomers in the presence of the polymer or polymer mixture A.

11 Claims, No Drawings

5,545,678

POLYMER SYSTEMS, PROCESS FOR THEIR PREPARATION, AND THEIR USE FOR PRINTING INKS

BACKGROUND OF THE INVENTION

1. Field of the Invention

The present invention relates to cationic polymer systems, to a process for their preparation and to their use as components of binders for printing inks.

2. Description Of Related Art

The term printing ink as used in this description refers not only to printable materials having an actual color effect but also to diluted printing inks which do not impart color. This term further refers to printable, noncolored clearcoats, which are capable of being diluted with water.

In order to ameliorate emission problems that arise when printing inks are applied, organic solvents are increasingly being replaced by water. It generally is known that resins having acidic or basic groups are employed as the fundamental components of aqueous printing inks. These resins typically are completely or partially neutralized in order to render them soluble or dispersible in water. In the aqueous phase, the resins possess a high capacity for accommodating pigments and/or fillers, and can also be employed as polymeric emulsifiers in emulsion polymerization processes for the production of dispersions. Moreover, to optimize printing properties, printing inks contain, for example, pigments, latex particles, filler materials, waxes, antifoams, film-consolidation agents and, frequently, organic solvents as well.

In the preparation of pigmented printing inks, pigments usually are milled in a portion of the binder employed, or in special binders: the paste resins or grinding resins. Printing inks then are produced from the resulting ink bases or milling pastes by making up the latter with remaining binder to form an ink. The grinding resins employed for such ink bases should conform to a range of properties. One important property is good wetting capacity for the relevant pigments. In addition, the grinding resins should be highly compatible with the principal binder and should not, in the required amount, substantially alter the properties of the principal binder.

The grinding resins also should be of low viscosity in the aqueous phase. Pigmented ink bases having a pigment/binder ratio (PBR) of >0.5:2, preferably at least 1:2, furthermore, should also be stable on storage so that the pigments do not settle or form agglomerates. The pastes also should not thicken, for example, by developing structural viscosity or thixotropy, since it is necessary for use in practice that they remain pumpable and flowable over a relatively long period of time. It also is advantageous to employ as grinding resins binders which are printable under the conventional conditions of printing processes and which also allow an acceptable pulp recovery quality on de-inking.

For these reasons, binders of cationic structure are preferably employed. For instance, DE-A 41 15 731 describes aqueous ink compositions in which the partial use of cationic resins is intended to produce the de-inkability preferred. The cationic resins described therein are commercially available acrylic resins.

Cationic polymer systems have been known for many years and are employed, in particular, for electrodeposition coating systems. Such resins are produced, for example, by reacting bisphenols with epichlorohydrin (1-step process leading to Taffy resins) or with bisepoxides (advancement reactions) followed by reaction with amines to give polymers having β-hydroxyamine structures, which after neutralization with acids, carry cationic charges (Houben-Weyl, METHODEN DER ORGANISCHEN CHEMIE [Methods of Organic Chemistry], 4th Edition, Vol. E20, p.1891 ff., Georg Thieme Verlag, Stuttgart 1987). These resins, however, cannot be used as binders for printing inks because of the reactive epoxides they contain, which after secondary reactions with the paper fibers, prevent a separation of printing ink from the paper. In addition, because of the polymer size and the content of flexibilizing substructures, such resins exhibit glass transition temperatures which are too low for them to be employed as rapid-drying binders for blocking-free and tack-free printing inks.

Binders which are dilutable in water after protonation with acid are the subject of U.S. Pat. No. 4,871, 808. This document describes reaction products of epoxides, amines and butadiene/acrylonitrile copolymers which are employed as active crosslinking components for cathodic electrodeposition. However, because of their low glass transition temperature, they cannot be used for printing systems.

U.S. Pat. No. 5,324,404 also describes binders which are dilutable in water in the presence of acid. These systems, however, are unsuitable for use as the binder base of aqueous printing inks because the resins contain high proportions by mass of flexibilizing polyether functions.

U.S. Pat. No. 4,554,212 describes binders for cathodically depositable coating compositions which contain a cationic synthetic resin in aqueous phase. The binders described, however, are unsuitable for use in the printing sector because the cationic resins only yield tack-free coatings after baking with crosslinking components.

German Application P 43 14 298.2 discloses cationic printing inks whose synthesis involves the addition of epoxide-free binders based on resins having β-hydroxyamine structures in the main chain. A grave disadvantage of the polymer resins described therein is their inadequate influence on water resistance and drying rate of the printing ink films, which are qualities for which improvement is sought. The disclosures of each of the documents discussed above are incorporated by reference herein in their entirety.

SUMMARY OF THE INVENTION

An object of the invention is to provide polymer systems which contain amino groups, which do not have the above-mentioned disadvantages of the prior art, and which can be employed as polymeric binder components in printing inks. An additional object of the invention is to provide a process for preparing polymer systems that contain amino groups and are useful as binders for printing inks.

These objects can be achieved, in accordance with the invention, by providing an amino-containing polymer system comprising (1) a polymer or polymer mixture A which can be prepared by reacting (a) at least one epoxide, carbonate or epoxide-carbonate, (b) at least one amine and (c) at least one phenol, and, optionally if desired, (2) a water-insoluble polymer B which can be polymerized from ethylenically unsaturated compounds in the presence of the polymer or polymer mixture A which has been at least partially neutralized.

The invention therefore relates to an amino-containing polymer system comprising (1) an amino-containing polymer or polymer mixture A having a glass transition temperature of at least 40° C., a weight-average molecular weight of 2,000–75,000 and an amine number of 50–300, at least 35% of whose amino groups are neutralized and which can be prepared by (i) reacting (a) at least one epoxide, carbonate, or epoxide-carbonate, (b) at least one amine and (c) at least one phenol;

(ii) at least partially neutralizing the resulting polymer or polymer mixture A and (iii) transferring to water. The amino-containing polymer system can further include, if desired, (2) a water-insoluble polymer B which can be prepared by polymerization of ethylenically unsaturated monomers in the presence of the polymer or polymer mixture A.

The invention also relates to a process for preparing a polymer system as described above by synthesizing an amino-containing polymer or polymer mixture A in bulk or in the presence of an organic solvent, from (a) at least one epoxide, carbonate or epoxide-carbonate, (b) at least one amine and (c) at least one phenol, neutralizing the resulting polymer or polymer mixture A to the extent of at least 35% and transferring the neutralized polymer or polymer mixture to water, and, if desired, preparing a water-insoluble polymer B in the presence of the polymer or polymer mixture A in the aqueous phase by emulsion or suspension polymerization.

DETAILED DESCRIPTION

The amino-containing polymers or polymer mixtures A preferably have a glass transition temperature of at least 50° C., more preferably at least 70° C. The amino-containing polymers or polymer mixtures further preferably have a weight-average molecular weight of from 3,000 to 60,000, more preferably from 4,000 to 40,000 and particularly preferably from 5,000 to 25,000. The amine number of the polymer or polymer mixture A is preferably 80–250, more preferably 90–180.

Preferably at least 50%, more preferably at least 65% and particularly preferably at least 80% of the amino groups in the polymer or polymer mixture A are neutralized. Those skilled in the art recognize how to neutralize amino groups in polymers or polymer mixtures using conventional procedures.

A particularly preferred embodiment of the invention concerns polymer mixtures A which comprise at least two different amino-containing polymers A1 and A2. In this particular embodiment the amino-containing polymers present in the polymer mixture A according to the invention preferably have different average molecular weights. In this context, the average molecular weight of the amino-containing polymer A1 preferably can be in the range from 500 to 5,000, in particular from 1,000 to 4,000, and the average molecular weight of the amino-containing polymer B preferably can be in the range between 5,000 and 20,000, in particular between 6,000 and 10,000. The polymer mixture A according to the invention typically contains the amino-containing polymers A1 and A2 in a weight ratio of from 95:5 to 5:95, preferably from 85:15 to 15:85 and more preferably from 75:25 to 25:75.

Examples of epoxide-amine adducts useful in the invention are reaction products of (1) epoxy-containing resins (a1) preferably having terminal epoxy groups, and/or carbonate-containing resins (a2) preferably having terminal carbonate groups, these resins being selected from polyglycidyl ethers, polyglycidyl esters and polyglycidylamines; with (2) mono- or polyhydric phenols (c) and/or alcohols, and with (3) saturated and/or unsaturated secondary and/or primary amines (b) or amino alcohols. The amines or amino alcohols can be modified on the alkyl radical by at least one primary and/or secondary hydroxyl group, by a dialkylamino group and/or by a primary amino group which is temporarily protected by the formation of a ketimine.

The invention also relates to a process for preparing a polymer system as described above by synthesizing an amino-containing polymer or polymer mixture A in bulk or in the presence of an organic solvent, from (a) at least one epoxide, carbonate and epoxide-carbonate, (b) at least one amine and (c) at least one phenol, neutralizing the resulting polymer or polymer mixture A to the extent of at least 35% and transferring the neutralized polymer or polymer mixture to water, and, if desired, preparing a water-insoluble polymer B in the presence of the polymer or polymer mixture A in the aqueous phase by emulsion or suspension polymerization.

A particular process variant includes first preparing a polymer mixture A by preparing at least one amino-containing polymer A2 in the presence of at least one amino-containing polymer A1.

The preparation of the polymers or polymer mixtures A according to the invention can be carried out such that a mixture of phenols (c1) which possess at least one phenolic hydroxyl group, and/or polyhydric alcohols (c2) and/or at least one amine (b 1 ) or polyamine (b2) are reacted with compounds (a) in such a way that the resulting reaction products no longer contain a free phenol, 1,2-epoxy or 2-oxo-1,3-dioxolane groups or any free primary or secondary amino groups. Throughout this description, the phrase "compounds (a)" denotes compounds (a1) and/or compounds (a2) discussed above, or (a3) discussed below, the phrase "compounds (b)" denotes compounds (b1) and/or compounds (b2) and the phrase "compounds (c)" denotes compounds (c1) and/or compounds (c2). The reaction sequence described above can be carried out in steps, based on compounds a, or else can be carried out such that, for example, compounds b as a mixture with compounds c are reacted with the compounds a.

The preparation of the polymers or polymer mixtures A according to the invention can be carried out such that, firstly, compounds (a1) containing at least one 1,2-epoxy group or compounds (a2) containing at least one 2-oxo-1, 3-dioxolane group (carbonate group) or mixed epoxide-carbonates (a3) each of which already contains the phenolic component c are, if desired, synthesized and reacted with at least one amine (b1) or polyamine (b2) in such a way that the resulting products A no longer contain any free 1,2-epoxy or 2-oxo-1,3-dioxolane groups or any free primary or secondary amino groups and are therefore substantially inert with respect to subsequent reactions with epoxides and/or amines. The term "free amino group" in this context refers to an amino group which still carries at least one hydrogen atom on the nitrogen.

The polymer synthesis can also be carried out such that, by choosing the compounds employed as a, b and c and the proportions thereof, different polymers A can be produced alongside one another. Those skilled in the art are capable of reacting the aforementioned compounds to produce the resulting products using the guidelines provided herein.

The epoxide compounds (a1) useful in the present invention typically possess on average at least one and preferably two 1,2-epoxy groups per molecule. They may be either unsaturated or saturated, aliphatic, cycloaliphatic, aromatic or heterocyclic and may also contain hydroxyl groups. Furthermore, it is possible for them to contain substituents which, under the mixing conditions or reaction conditions, do not bring about any interfering secondary reactions, for example alkyl substituents, aryl substituents, alkyl/aryl substituents, ether groups or the like. Examples of useful epoxide compounds (a1) include glycidyl ethers of polyhydric phenols, for example resorcinol, hydroquinone, 4,4'-dihydroxydiphenylmethane, isomer mixtures of dihydroxydiphenylmethane (bisphenol F), 4,4'-dihydroxy-3,3'-dimethyldiphenylmethane, 4,4'-dihydroxydiphenyldimethylmethane (bisphenol A), 4,4'dihydroxydiphenylmethane, 4,4'-dihydroxydiphenylcyclohexane, 4,4'-dihydroxy-3,3-dimethyldiphenylpropane, 4,4'-dihydroxybiphenyl, 4,4'-dihydroxydiphenyl sulfone, tris(4-hydroxyphenyl)methane, 4,4'-dihydroxybenzophenone, 1,1-bis(4-hydroxyphenyl)isobutane, 2,2-bis(4-hydroxy-tert-butylphenyl)propane, bis(2-hydroxynaphthyl)methane, 1,5-dihydroxynaphthalene, bis(4-hydroxyphenyl) ether or the hydrogenation, chlorination and bromination products of the above-mentioned compounds, and also novolaks. The partial use of glycidyl ethers of polyhydric alcohols as compounds a1 is also suitable. Examples of such polyhydric alcohols are ethylene glycol, diethylene glycol, triethylene glycol, 1,2-propylene glycol, 1,4-propylene glycol, 1,5-pentanediol, 1,2,6-hexanetriol, glycerol, trimethylolpropane and 2,2-bis(4-hydroxycyclohexyl)propane.

Glycidyl ethers in the context of this invention can preferably represent those glycidyl ethers of the formula I

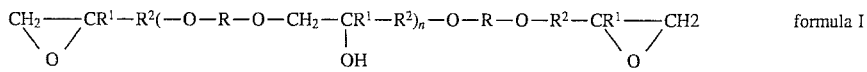

where R=

$R^1$, $R^{1'}$ and $R^{1''}$ =independently of one another H or $C_mH_{2m+1}$, $R^2$=linear or branched saturated hydrocarbon radical having up to 8 carbon atoms, preferably —CH$_2$—, $R^3$ and $R^{3'}$=independently of one another, represent halogen, aryl, alkyl and/or aralkyl, n=from 0 to 8, preferably from 1 to 6, m from 1 to 8, preferably 1, u, u'=independently of one another represent an integer from 0 to 4, and preferably represent 0 or 1.

These polyglycidyl ethers usually have an average molecular mass ($M_n$) of from about 200 to 10,000 and an epoxide equivalent weight of from about 120 to 5,000. Such resins can be reaction products of epichlorohydrin or methylepichlorohydrin with dihydroxydiphenylmethane (bisphenol F) or dihydroxydiphenylpropane (bisphenol A), and with dihydroxybenzophenone or dihydroxynaphthalene. Polyepoxides of suitable molecular weight are prepared either by selecting the molar ratios of bisphenol and epichlorohydrin or by reacting the monomeric diglycidyl compounds with further bisphenol, if desired with the addition of catalysts such as Lewis acids or phosphonium salts. The epoxy resins may be completely or partially hydrogenated or may be employed in mixtures with varying structure and molecular mass.

In addition, a portion of the polyglycidyl ether described can be replaced by aliphatic polyglycidyl ethers of the formula II

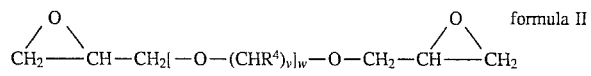

where $R^4$=H or a substituted or unsubstituted ($C_1$–$C_4$)-alkyl radical, v=from 2 to 6 and w=from 2 to 100, preferably from 3 to 50.

Suitable examples of useful compounds of formula II include bisglycidyl ethers of polypropylene glycol or polybutylene glycol of different molecular weights.

The epoxy resins also can be modified by reaction with long-chain polyalcohols such as hexane- 1,6-diol, neopentylglycol, bisethoxylated neopentylglycol, neopentylglycol hydroxypivalate and bis(hydroxymethyl)cyclohexane, monoanhydropentaerythritol and polytetrahydrofurandiol, polycaprolactonediol, polycaprolactamdiol or polybutadienediol in the presence of suitable basic or acidic catalysts, such as boron fluoride/amine complexes. Whereas polyalcohols having primary hydroxyl groups, given appropriate catalysis, can be reacted directly with polyglycidyl ethers, secondary hydroxyl groups can be reacted first of all with diisocyanate. The resulting isocyanate-terminated reaction product then can be incorporated without difficulties as a bridge between two polyglycidyl ether units, thereby increasing the molecular weight and the functionality. Other suitable epoxide compounds include (poly)glycidyl esters of the formula III

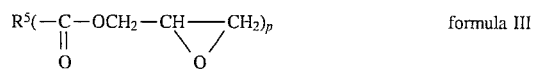

where $R^5$=linear or branched, saturated or unsaturated hydrocarbon radical having up to 40, preferably up to 10, carbon atoms, or a substituted or unsubstituted phenyl radical, and p=an integer from 1 to 5, preferably 2 or 3, especially 2.

Such polyglycidyl esters of polycarboxylic acids can be obtained by reacting epichlorohydrin or similar epoxy compounds with an aliphatic, cycloaliphatic or aromatic polycarboxylic acid, such as oxalic acid, adipic acid, glutaric acid, terephthalic acid, hexahydrophthalic acid, 2,6-naphthalenedicarboxylic acid and dimerized fatty acids. Examples of these are diglycidyl terephthalate and diglycidyl hexahydrophthalate. Other compounds suitable as epoxy-containing resins (a1) are those in which some of the epoxy groups have been reacted with amines. In order to reduce the amine number of these resins, such amino-epoxy resins may also be modified further with saturated or unsaturated polycarboxylic acids and/or hydroxyalkanecarboxylic acids. Examples of aliphatic, cycloaliphatic and/or aromatic polycarboxylic acids of various chain lengths include adipic acid, sebacic acid, fumaric acid and maleic acid and their anhydrides, isophthalic acid and dimeric fatty acid. Throughout this description, the term "hydroxyalkanecarboxylic acids" includes lactic acid, dimethylolpropionic acid and also polyesters which contain carboxyl and hydroxyl groups. The reaction of excess polyglycidyl ether of low molecular weight with polycarboxylic acids and/or polyalcohols produces modified polyglycidyl ethers as intermediate, which can then be reacted further with amines and/or amino alcohols.

It also is possible to use heterocyclic polyepoxide compounds such as 1,3-diglycidyl-5,5-dimethylhydantoin, triglycidyl isocyanurate or diepoxides of bisimides. Another suitable class of polyepoxides comprises polyglycidyl ethers of phenolic novolak resins, which can be used to raise the functionality from about 2 to about 6 glycidyl groups per molecule. By defunctionalization using long-chain alkylphenols such as dodecylphenol, additional substructures can be incorporated.

Other suitable epoxide compounds are described in the handbook EPOXIDVERBINDUNGEN UND EPOXIDHARZE [Epoxide Compounds and Epoxy Resins] by A. M. Paquin, Springer Verlag, Berlin 1958, Chapter IV; in Lee, Neville, HANDBOOK OF EPOXY RESINS, 1967, Chapter 2 and in Wagner/Sarx, LACKKUNSTHARZE [Synthetic Resins for Coatings], Carl Hanser Verlag (1971), p.174 ff.

The compounds employed as (a2) may be any desired materials which contain at least one, preferably two or three 2-oxo-1,3-dioxolane groups (cyclic carbonate groups) per molecule and do not include other functional groups which interfere with the reaction with component (b). The molecular weight M. (number average, determined by gel chromatography using polystyrenes as standard) should in general be between 100 and 10,000, preferably between 150 and 5,000, and the 2-oxo-1,3-dioxolane equivalent weight should be between 100 and 1,500. The cyclic carbonate groups preferably are terminal, but it also is possible to employ as component (a2) compounds that contain these groups randomly distributed throughout the molecular chain and which can be prepared by copolymerization using olefinically unsaturated compounds which contain these cyclic carbonate groups. One example of such a preparation process is described in U.S. Pat. No. 4 882 391 the disclosure of which is incorporated by reference herein in its entirety.

Component (a2) preferably can be represented by the formula IV

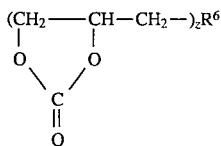

formula IV $R^6$=z-valent radical of a phenol, polyether, polyetherpolyol, polyester, polyesterpolyol, which if desired may also contain amino or alkylamino groups, or z-valent hydrocarbon radical, preferably alkylene radical having from 2 to 18 carbon atoms, which may if desired carry inert groups, or z-valent poly(secondary)amine radical, or z-valent radical of a reaction product of an epoxy-carbonate compound with polyamines, polyols, polycaprolactonepolyols, hydroxyl-containing polyesters, polyethers, polyglycols, hydroxyl-, carboxyl-, and amino-functional polymer oils having average molecular weights of from 800 to 10,000, polycarboxylic acids, hydroxyl- or aminofunctional polytetrahydrofurans and reaction products of polyamines with glycidyl esters of α,α-dialkylalkanemonocarboxylic acids of the empirical formula $C_{12}H_{22}O_3$ to $C_{14}H_{26}O_3$, for example of Versatic acid (Shell Chemie, α-branched monocarboxylic acid having from 9 to 12 carbon atoms), and z=an integer of from 1 to 5, preferably 2 or 3, especially 2.

Examples of such compounds and their preparation are described in U.S. Pat. No. 5,132,458 the disclosure of which is incorporated by reference herein in its entirety.

In many cases it may be advantageous to use, as component (a3), in addition to component (a2), or if desired exclusively, mixed epoxide-carbonates of the formula V

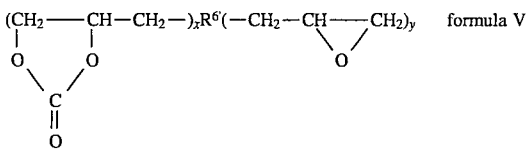

formula V where $R^{6'}$=(x+y)-valent radical of a phenol, polyether, polyetherpolyol, polyester, polyesterpolyol, which if desired may also contain amino or alkylamino groups, or (x+y)-valent hydrocarbon radical, preferably alkylene radical having from 2 to 18 carbon atoms, which may if desired carry inert groups, or (x+y)-valent poly(secondary)amine radical, or (x+y)-valent radical of a reaction product of an epoxy-carbonate compound with polyamines, polyols, polycaprolactonepolyols, hydroxyl-containing polyesters, polyethers, polyglycols, hydroxyl-, carboxyl-, and amino-functional polymer oils having average molecular weights of from 800 to 10,000, polycarboxylic acids, hydroxyl-or aminofunctional polytetrahydrofurans and reaction products of polyamines with glycidyl esters of α,α-dialkylalkanemonocarboxylic acids of the empirical formula $C_{12}H_{22}O_3$ to $C_{14}H_{26}O_3$, for example of Versatic acid, x and y=independently of one another represent an integer of from 1 to 5, preferably 2 or 3, especially 1.

Preferred starting materials for the preparation of the cyclic carbonates (a2), and of the mixed epoxy-carbonate compounds (a3) which may be employed if desired, are the polyglycidyl ethers of polyhydric phenols and alcohols, for example bisphenol A or bisphenol F. The glycidyl ethers are obtained, for example, by reacting a polyphenol with epichlorohydrin. Examples of polyphenols are 2,2-bis(4-hydroxyphenyl)propane, bis(4-hydroxyphenyl)methane, 4,4'-dihydroxybenzophenone, bis(4-hydroxyphenyl) ether, 1,1-bis(4-hydroxyphenyl)isobutane, bis(2-hydroxynaphthyl)methane and 1,5-dihydroxynaphthalene. Preferably, free hydroxyl groups are present in addition to the epoxy groups in the polyglycidyl ether of the polyphenol. Diglycidyl adducts of cyclic ureas also can be employed.

As amines (b1) it is possible to use primary monoamines, preferably those with alkyl and alkanol groups. Suitable amines include, for example methylamine, ethylamine, propylamine, isopropylamine, butylamine, isobutylamine, 2-aminobutane, 4-amino-2-butanol, isoamylamine, pentylamine, 3-methylbutylamine, heptylamine, octylamine, 2-ethylhexylamine, isononylamine, isotridecylamine, 2-aminomethyl-1-propanol, monoethanolamine, mono(n- or iso)propanolamine, neopentanolamine, methoxypropylamine, 2-(2-aminoethoxy)ethanol, coconut fatty amine, oleylamine, stearylamine, tallow fatty amine, decylamine, dodecylamine, tetradecylamine, hexadecylamine, octadecylamine, cyclopentylamine, cyclohexylamine, 3-methoxypropylamine, 3-ethoxypropylamine, 3-butoxypropylamine, 3-isononyloxypropylamine,3-aminopropyltrimethoxy-(ethoxytridecyloxy)silane, and 2-amino-2- hydroxymethyl-1,3-propanediol.

It also is possible to use secondary monoamines, preferably dialkylamines, monoalkylhydroxyalkylamines or dihydroxyalkylamines. Examples of such compounds are dimethylamine, diethylamine, dipropylamine, di(n- or iso)propylamine, dibutylamine, diisobutylamine, di-sec-butylamine, N-methylbutylamine, N-methylaminoethanol, diethanolamine, dipentylamine, dioctylamine, di(2-ethylhexyl)amine, diisononylamine, N-ethylbutylamine, N-ethylcyclohexylamine, dicyclohexylamine, distearylamine, dicoconutamine, ditallow fatty amine or cyclic amines such as morpholine, pyrrolidine or oxazolidine, or substituted or unsubstituted aniline. Similarly, reaction products of primary monoamines with monoepoxides can be employed as a substitute for the secondary amines.

It also is possible to employ primary amines of the formula VI in the present invention

$H_2-N-CR^7R^8-R^9-O-(CHR^{10}-CHR^{11}O-)_qR^{12}$  formula VI where $R^7$ and $R^8$=hydrogen, an alkyl radical or a hydroxyl group, $R^9$=a linear or branched alkyl radical, in particular an alkyl radical of 1 to 3 carbon atoms, $R^{10}$ and $R^{11}$=hydrogen or an alkyl radical having 1 to 4 carbon atoms, $R^{12}$=hydrogen, an alkyl, cycloalkyl or phenyl radical, preferably an alkyl radical having 1 to 6 carbon atoms, and q=an integer of from 0 to 5.

Examples of compounds of this type which can be employed in the invention include ethanolamine, propanolamine, butanolamine, ethylene glycol 2-aminoethyl ether and diethylene glycol mono-(3-aminopropyl) ether. When primary amines are employed the amine can be reacted with the epoxy group with molecular enlargement, as a function of the stoichiometric conditions available. Examples of amines are the ®Jeffamin M, D and ED series available from Texaco (ethoxylated/propoxylated amines). Other suitable compounds include diamines or triamines having primary and/or secondary amino groups, for example laurylpropylenediamine and tallow fatty propylenediamine.

While the reaction of the primary monoamines with compounds (a1) generally is one of chain extension, and the reaction with compounds (a2) one of chain termination, the secondary monoamines generally are to be employed with compounds (a1) as chain terminators. In addition to the chain-extending action of the primary amines, however, the formation of some secondary amino groups from their reaction with (a1) can also be utilized for raising the amine number. Compounds (a3) and/or the polyamines (b2) also participate in corresponding reactions.

Polyamines (b2) are understood in the context of this invention as including compounds containing at least two amino groups per molecule. In general these compounds possess from 2 to 50 carbon atoms, preferably from 2 to 20 carbon atoms.

Examples of suitable polyamines (b2) are those which contain only primary amino groups and are preferably di-primary. The reaction of these polyamines with compounds (a2) leads to chain extension, and they are preferably employed as a mixture with the polyamines, especially primary/tertiary diamines. The latter, when they react with an at least difunctional compound (a2), act as chain terminators. Those skilled in the art are capable of reacting these primary/tertiary diamines with compounds (a2) in accordance with the guidelines provided herein.

Other examples of suitable polyamines (b2) are those which contain only secondary amino groups and are preferably di-secondary. The reaction of these polyamines with compounds (a1) is one of chain extension. Long-chain diamines are preferred, for example N,N'-dialkyldiaminoalkanes, or reaction products of monoepoxides, for example saturated glycidyl ethers or glycidyl esters, or epoxyalkanes with primary diaminoalkanes, for example the addition product of 1,6-hexanediamine with 2 mol of Versatic acid glycidyl ester. Monoepoxides which can be employed for this purpose are also saturated or unsaturated glycidyl ethers, or α-epoxides of various chain lengths, such as 1,2-epoxydodecane, or butylene oxide.

Other suitable polyamines (b2) are those polyamines containing at least one free primary amino group and, in addition, secondary and/or tertiary amino groups as well. Polyamines containing secondary as well as primary amino functions, after reaction with component (a2), can be reacted with, for example, compounds (a1) and/or mono-epoxide compounds, preferably ethylene oxide, propylene oxide, glycidyl 2-ethylhexanoate or Versatic acid glycidyl ester, with the formation of tertiary groups. Alternatively, they can also be reacted with isocyanates to form urea structures.

An example of polyamines (b2) useful in the present invention can be represented by formula VII below.

$H_2N-(R^{13}N)_s-R^{14'}$  formula VII where s=zero or an integer from 1 to 6, preferably from 1 to 4, $R^{13}$=a divalent, preferably nonaromatic hydrocarbon radical having 2 to 18 carbon atoms, preferably a branched or linear alkylene radical having 2 to 10 carbon atoms, especially 2 to 6 carbon atoms, or a cycloalkylene radical having 5 to 12 carbon atoms, preferably 6 to 10 carbon atoms, or an aralkylene radical having 7 to 12 carbon atoms, preferably 8 to 10 carbon atoms, or a polyoxyalkylene radical have 2 to 18 carbon atoms, $R^{14}$ and $R^{14'}$=independently of one another H or

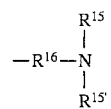

$$-R^{16}-N\begin{matrix}R^{15}\\|\\R^{15'}\end{matrix}$$

where $R^{15}$ and $R^{15'}$=independently of one another H, $(C_1-C_{20})$-alkyl, preferably $(C_1-C_6)$-alkyl, $(C_1-C_{16})$-hydroxyalkyl, preferably

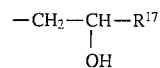

$$-CH_2-CH-R^{17}\\ \phantom{-CH_2-}| \\ \phantom{-CH_2-}OH$$

$R^{16}$=independently of $R^{13}$, the compounds represented by $R^{13}$, $R^{17}=(C_1-C_{12})$-alkyl, $-CH_2-O-(C_1-C_{12})$-alkyl,

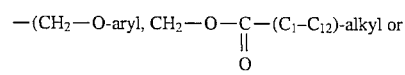

$-(CH_2-O\text{-aryl}, CH_2-O-\underset{\underset{O}{\|}}{C}-(C_1-C_{12})\text{-alkyl or}$

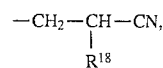

$$-CH_2-CH-CN,\\ \phantom{-CH_2-}|\\ \phantom{-CH_2-}R^{18}$$

$R^{18}$=H or $(C_1-C_6)$-alkyl, or $R^{15}$ and $R^{16}$=part of a 5-, 6- or 7-membered aliphatic ring, with the proviso that if s is zero $W^{14'}$ is not H.

Other suitable polyamines useful in the invention can be represented by the formula VIII $$X-(R^{19}NH)_t-R^{20}-Y \qquad \text{formula VIII}$$

in which X and Y=$NH_2$ or OH, but are not the same, and $R^{19}$ and $R^{20}$ independently of one another are the same as $R^{13}$ in formula VII above, and t is the same as s in formula VII above.

In addition to these, other examples of suitable polyamines and polyaminopolyols are those described in Patent Applications U.S. Pat. Nos. 4,885,392 5,132,458 and 4,940,768. Reference is hereby made to these documents, including the preferred embodiments described therein. The disclosures of each of these documents is incorporated by references herein in their entirety. Also suitable are polyaminoamides or condensation products of diprimary amines with dicarboxylic acids, for example, adipic acid or dimeric fatty acids, and polyglycolpolyamines or amine adducts, for example amine-epoxy resin adducts.

Examples of polyamines (b2)useful in the present invention include ethylenediamine, propylenediamine, 2-methylpentamethylenediamine, pentamethylenediamine, hexamethylenediamine, trimethylhexamethylenediamine, neopentyldiamine, octamethylenediamine, triacetonediamine, dioxadecanediamine, dioxadodecanediamine and higher homologs, cycloaliphatic diamines such as 1,2-, 1,3- or 1,4-cyclohexanediamine, and also laurylpropylenediamine and tallow fatty propylenediamine, 4,4'-methylenebiscyclohexylamine, 4,4'-isopropylenebiscyclohexylamine, isophoronediamine, tricyclododecenyldiamine, menthanediamine, 4,4'-diamino-3,3'-dimethyldicyclohexylmethane-3-aminomethyl- 1-( 3-aminopropyl- 1-methyl)-4-methylcyclohexane, N-methylethylenediamine, N-aminoethylpiperazine, 2-aminoethylpiperazine, N,N-dimethylethylenediamine, N,N-dimethylpropylenediamine, N,N-dimethylaminopropylamine, N,N-bisaminopropyl-N, N'-dimethylaminopropylamine, N,N-dihydroxyethylenediamine, aromatic amines such as m-xylylenediamine, aliphatic polytriamines and polytetraamines such as diethylenetriamine, dipropylenetriamine, bishexamethylenetriamine, triethylenetetraamine, tetraethylenepentamine, pentaethylenehexamine,methyliminobispropylamine, N-alkylaminodipropylenetriamine (alkyl=$CH_3$—, $C_4H_9$—, $(CH_3)_2N(CH_2)_3$—), tetrapropylenepentamine, and also alkanolamines such as aminoethylethanolamine, N-(2-hydroxypropyl)ethylenediamine, ethylene glycol bispropylamine,hydroxyethylaminoethylamine,hydroxyethyldiethylenetriamine and polyoxypropylenediamine, preferably with an average molecular weight of from about 200 to 400. Preferred polyamines are N,N-bisaminopropyl-N-methlamine, N-aminopropylmethylamine, N-aminopropylpropylamine, tallow fatty propylenediamine and, in particular, dimethylaminopropylamine, and diethylaminopropylamine and N-cyclohexyl-1,3-propylenediamine, 3-dimethylaminopropylamine, 2-diethylaminoethylamine, and dimethylaminoneopentylamine.

Phenols (c) which are useful in the invention and which may be employed individually or as a mixture include phenol, m-cresol, 3,5-dimethylphenol, m-ethoxyphenol, p-hydroxybenzylphenol and o-hydroxybenzylphenol. Preference is given to employing phenols (c) which contain at least two phenolic hydroxyl functions, examples being resorcinol, hydroquinone, 4,4'-dihydroxydiphenylmethane, isomer mixtures of dihydroxydiphenylmethane (bisphenol F), 4,4'-dihydroxy-3,3'-dimethyldiphenylmethane, 4,4'-dihydroxydiphenyldimethylmethane (bisphenol A), 4,4'-dihydroxydiphenylmethane, 4,4'-dihydroxydiphenylcyclohexane, 4,4'-dihydroxy-3,3'-dimethyldiphenylpropane, 1,2-, 1,3-, 1,5-, 1,6-, 2,2'- and 4,4'-dihydroxybiphenyl, 4,4'-, 2,5'- and 3,3'-dihydroxy-2,2'-bipyridyl, 4,4'-dihydroxydiphenyl sulfone, 4,4'-bis(4-hydroxyphenyl)valeric acid and its amide, bis(4-hydroxyphenyl) sulfide, 2,2-bis(4-hydroxyphenyl) acetic acid and its amide, tris(4-hydroxyphenyl)methane, 4,4'-dihydroxybenzophenone, 1,1-bis(4-hydroxyphenyl)isobutane2,2-bis(4-hydroxy-tert-butylphenyl)propane, bis(2-hydroxynaphthyl)methane, 1,5-dihydroxynaphthalene, bis(4-hydroxyphenyl) ether or the hydrogenation, chlorination and bromination products of the abovementioned compounds, and also novolaks. Resorcinol, bisphenol A and bisphenol F are particularly preferred.

Phenols (c) which preferably are used include alkylated, arylated or alkarylated and, if desired, isomeric mono- and/or polyhydric phenols. Alkylation, arylation and aralkylation in this context refers to the electrophilic substitution of aromatic rings of the basic phenol structure with unsaturated compounds. The phenols (c) can be characterized in particular by the formula IX

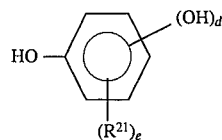

formula IX where $R^{21}$–$(C_2$–$C_{18})$-alkyl, preferably $(C_2$–$C_4)$-alkyl, $(C_5$–$C_6)$-cycloalkyl, phenyl, phenyl substituted by at least one $(C_1$–$C_{18})$-alkyl radical, or $(C_2$–$C_{18})$-alkyl alkyl substituted by at least one phenyl radical, d=an integer from 0 to 4, preferably 1 or 2, and e=an integer from 1 to 5, the value of e being less than or equal to the difference of 5 minus d, or the phenols (c) can be represented by the formula X

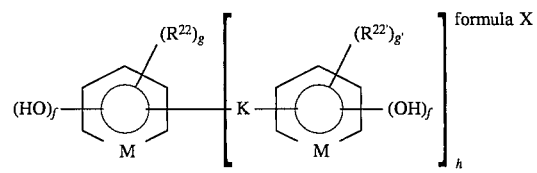

formula X where f=an integer of 1 or 2, g=an integer from 1 to 4, g'=an integer from 0 to 4, h=an integer of 1 or 2

M=CH— or a heteroatom, preferably a nitrogen atom, $R^{22}$=the same meaning as $R^{21}$ of formula IX, $R^{22'}$=H or the same meaning as $R^{21}$ of formula IX, K=a single bond, $CH_2$, $C(CH_3)_2$, S(O), S, S—S, C(O) or a group of the formula XI

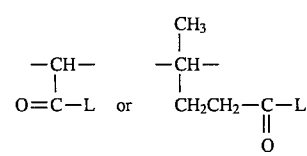

formula XI where

L=a hydroxyl group,

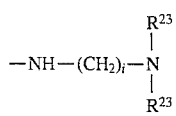

or a group of the formula XII

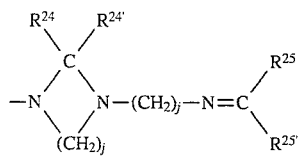

where

R$^{23}$,R$^{24}$,R$^{25}$,R$^{23'}$,R$^{24'}$ and R$^{25'}$=independently of one another hydrogen or (C$_1$–C$_4$)-alkyl, i, j,=independently of one another, an integer of from 1 to 4, preferably 2 or 3.

For the preparation of the alkylated, arylated or alkarylated phenols (c) which it is preferred to employ in accordance with the invention, the phenolic base structures employed may be mono- or polycyclic phenols, for example phenol, and preferably those which carry two or more hydroxyl groups on the same aromatic ring, for example phloroglucinol, pyrogallol, hydroquinone, pyrocatechol, and especially resorcinol.

Other suitable basic phenol structures are phenols based on condensed aromatic ring systems. A typical condensed aromatic ring system can be represented, for example, by the formula XIII

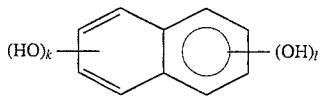

or the formula XIV

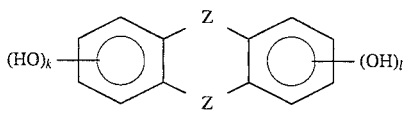

where k=from 0 to 2, l=from 1 to 3, preferably 1 or 2, the sum of k and 1 being at least 2, and Z═CH—, >C═O, an oxygen atom or a nitrogen atom.

Examples of suitable condensed aromatic ring systems include 1,4-dihydroxynaphthalene and its positional isomers, dihydroxyanthraquinone, quinizarine and anthraflavic acid.

Phenols (c) also can be used in turn as basic phenol structures for the preparation of further compounds (c).

The mono(alkylaryl)phenols which preferrably are employed as phenols (c) are compounds which are commonly referred to in the literature as styrenated phenols. In accordance with the comments in U.S. Pat. No. 3,770,544, the reactions of styrenes with phenols are known and essentially constitute alkylation reactions in which the vinyl group of the styrenes is incorporated by addition to the ortho- or para-position (relative to the hydroxyl group) of the phenol. For this reaction, Friedel-Crafts catalysts are generally used, for example acids and Lewis acids. Depending on the reaction conditions, catalysts and the relative proportions of the reactants, the reaction produces mono-, di- or tri-styrenated phenols. German Offenlegungsschrift De-A 1 940 220 has also disclosed arylalkylphenol products and processes for their preparation. The disclosures of each of these documents are incorporated by references herein in their entirety.

Preferred arylalkylphenols (c) can be prepared by addition reaction of a vinyl compound with phenols, employing a molar ratio of the phenolic hydroxyl groups in the phenol to the aromatic vinyl compound of from 1:1 to 1:2, in the presence of a mineral acid or Friedel-Crafts catalysts, by a known method. Those skilled in the art are capable of preparing arylakylphenols (c) in accordance with the guidelines presented herein.

Vinyl compounds which can be used include natural or synthetic compounds containing one or more carbon-carbon double bonds, including conjugated double bonds where more than one are present. Natural unsaturated compounds which can be used are unsaturated fatty acids, the fatty oils derived therefrom, fatty acid amides or fatty alcohols. Other suitable starting compounds are unsaturated, terpene-based natural substances, for example turpentine oil or colophony. Synthetic unsaturated hydrocarbon compounds which can be used are alkenes, dienes or more highly unsaturated hydrocarbons, examples being butene, isobutene, isooctene, isononene, isododecene, or diunsaturated compounds, for example butadiene, isoprene, chloroprene, dichlorobutadiene and dicyclopentadiene. It also is possible to use mixtures of alkenes and, if desired, of alkenes with alkanes, as are produced, for example, in the cracking or dehydrogenation of hydrocarbons, for example mineral oil, or the oligomerization of olefins, especially of isobutene, propene or n-butene, or from the oxidation of coal. Other suitable compounds include those comprising acetylenic unsaturation, for example acetylene, (C$_1$–C$_{10}$)-alkylacetylenes or di(C$_1$–C$_{10}$)-alkylacetylenes.

Examples of unsaturated compounds which can be used as starting materials for the preparation of compounds (c) include n-pent-1-ene, n-hex-1-ene, n-oct-1-ene, n-non-1-ene, n-dec-1-ene, n-undec-1-ene, n-dodec-1-ene, 1-propene, n-but-1-ene, the aforementioned alkenes substituted in position 2 or 3 or, if appropriate, 4 by methyl, ethyl, n-propyl, isopropyl, n-butyl, isobutyl, sec-butyl or tert-butyl; 2,3-dimethyl-n-butene, 3,3-dimethyl-n-butene, 2,5-dimethylheptene, 3,3-dimethylheptene, 2,3,4-trimethylheptene, 2,4-dimethylheptene, 2,3-dimethylheptene, 4,4-dimethylheptene, 2,3-diethylhexene, 4,4-dimethylhexane, 2,3-dimethylhexene, 2,4-dimethylhexene, 2,5-dimethylhexene, 3,3-dimethylhexene, 3,4-dimethylhexene, 2-methyl-3-ethylpentene, 3-methyl-3-ethylpentene, 2,3,3-trimethylheptene, 2,4,4-trimethylpentene, 2,3,3-trimethylpentene, 2,3,4-trimethylpentene, 2,3,3,4-tetramethylpentene; analogous alkenes whose double bond in the molecule is in position 2 or 3; branched alkenes as obtained in the form of mixtures from the dimerization of isobutene or n-butene (octenes) or the trimerization of isobutene or n-butene (dodecenes) or propene (nonenes) or the tetramerization of propene (dodecenes).

The aromatic vinyl compounds employed in the invention can be, in particular, styrene derivatives. Examples of suitable styrene derivatives include α-methylstyrene, styrene, o-methylstyrene, m-methylstyrene, p-methylstyrene, commercial vinyl toluene (isomer mixture), 3,4-dimethylstyrene, 2,4-dimethylstyrene, 2,5-dimethylstyrene, 2,6-dimethylstyrene, o-ethylstyrene, m-ethylstyrene, p-ethylstyrene, 3,4-diethylstyrene, 2,4-diethylstyrene, 2,5-diethylstyrene, 2,6-diethylstyrene, o-propylstyrene, m-propylstyrene, p-propylstyrene, o-isopropylstyrene, m-isopropylstyrene, p-isopropylstyrene, o-butylstyrene, m-butylstyrene, p-butylstyrene, o-isobutylstyrene, m-isobutylstyrene, p-isobutylstyrene, sec-butylstyrene, m-sec-butylstyrene, p-sec-butylstyrene, o-tert-butylstyrene, m-tert-butylstyrene, p-tert-butylstyrene, p-bromostyrene, p-chlorostyrene, 2,4-dibromostyrene, 2,4-dichlorostyrene, 2,4,6-trichlorostyrene.

Particularly preferred vinyl compounds are aromatic vinyl compounds of the formula XV

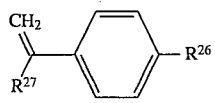
formula XV in which $R^{26}$ is a hydrogen atom or a methyl radical and $R^{27}$ is a hydrogen atom or a alkyl radical having 1–3 carbon atoms, or the

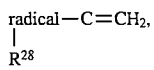

in which $R^{28}$, independently, may be the same as $R^{26}$, examples being styrene and α-methylstyrene.

To prepare the polymers or polymer mixtures A from components (a), (b) and (c), the molar ratios between the compounds containing epoxide, cyclic carbonate, amino and phenol groups should be chosen so as to ensure the complete incorporation of the phenol, carbonate and epoxy groups. The reactions are generally carried out until a constant amine number, or the theoretical amine number, has been reached. Reactions of compounds (a), (b) and (c) are carried out with the stoichiometric proportions required at elevated temperatures, for example from 40° to 300° C., preferably from 50 to 250° C. and particularly preferably at between 80° and 200° C., with solvents and/or catalysts being used if desired. Care should be taken to ensure that gelation does not occur.

All of the amines can be reacted simultaneously with the epoxy groups and/or carbonate groups, or a stepwise procedure can be followed. In this way, mixtures of different epoxide-amine adducts and/or carbonate amine adducts can also be obtained. The reaction with the amines can begin at room temperature and generally is exothermic. In order to achieve complete reaction, it generally is necessary to raise the temperature for a time to between 40° and 250° C.

While the use of catalyst generally is not necessary for the reaction of primary amino groups with the 2-oxo-1,3-dioxolane groups, catalysis is advantageous for the reaction of the secondary amino groups, which are slower to react. Catalysts suitable for this purpose are strongly basic compounds such as quaternary ammonium compounds, examples being alkylammonium, arylammonium and/or benzylammonium hydroxides and the corresponding carbonates. Specific representatives of quaternary ammonium compounds in this context are ($C_{16}$–$C_{22}$-alkyl)benzyldimethylammonium hydroxide, benzyltrimethylammonium hydroxide and tetrabutylammonium hydroxide. Preferred catalysts are strongly basic amines, for example diazabicyclooctane (DABCO) and guanidine. Other suitable compounds here are so-called supernucleophilic catalysts, for example 4-pyrrolidinylpyridine and poly(N,N-dialkylaminopyridines) (cf. in this respect the article by R. A. Vaidya et al., in POLYMER PREPRINTS, Vol. 2 (1986), pp. 101–102), the disclosure of which is incorporated by reference herein in its entirety. Those skilled in the art are capable of preparing polymer or polymer mixtures A in accordance with the guidelines presented herein.

As an option in preparing the resin systems according to the invention, it further is possible to add solvents which can be removed in vacuo at the completion of the resin syntheses, examples thereof including glycol ethers such as ethylene glycols, propylene glycols, butylene glycols, for example methylglycol, ethylglycol, butylglycol, methyldiglycol, ethyldiglycol, butyldiglycol, methyltriglycol, ethyltriglycol, butyltriglycol, methyltetraglycol, ethyltetraglycol, butyltetraglycol, ®Polyglykol-M-250 (MW=260–275, OH number 204–215), ®Polyglykol-M-350 (MW=335–265, OH number 154–167), 2-n-propoxyethanol, 2-(1-methylethoxy)ethanol, 2-n-butoxyethanol, 2-(2-methoxyethoxy)ethanol, 2-(2-ethoxyethoxy)ethanol, 2-(2-butoxyethoxy)ethanol, triethylene glycol monomethyl ether, tetraethylene glycol monomethyl ether, 2,5,8,11-tetraoxadodecane, 1-methoxy-2-propanol, 1-ethoxy-2-propanol, tripropylene glycol monomethyl ether, propylene glycol methyl ether, dipropylene glycol methyl ether, tripropylene glycol methyl ether, propylene glycol n-butyl ether, dipropylene glycol n-butyl ether, tripropylene glycol n-butyl ether, ®PHB (MW >250, b.p. >274° C.) and propylene glycol phenyl ether.

Suitable neutralizing agents include organic acids, for example formic acid, dimethylolpropionic acid, acetic acid, glycolic acid, gluconic acid, hydroxyacetic acid, propionic acid, butyric acid, lactic acid, valeric acid, caproic acid, oenanthic acid, caprylic acid, pelargonic acid, capric acid, lauric acid, myristic acid, palmitic acid and stearic acid, preferably formic acid, acetic acid and lactic acid, and also inorganic acids, for example phosphoric acid, sulfuric acid, boric acid and hydrochloric acid.

In accordance with the invention, the synthetic-resin mixtures contain not only the polymers or polymer mixtures A but also, optionally, polymers B. Polymer resins B are prepared by polymerization in the presence of A, A being present in at least partially neutralized form and optionally in water. Under conditions of emulsion polymerization, the polymers or polymer mixtures A should be present in such a quantity and with such a degree of neutralization as to ensure that the desired emulsification effects are brought about. On the other hand, the proportion of resins A and their degree of neutralization should not be too high, both for economic reasons and for reasons of the effect on the performance properties of the emulsion polymers to be prepared. The content of polymers or polymer mixtures A employed is therefore preferably from 4 to 56% by weight, in particular from 10 to 50% by weight and particularly preferably from 12 to 42% by weight, based on the total quantity of polymers A and B.

Processes of emulsion polymerization are known to those skilled in the art. They generally are characterized by the free-radical polymerization of ethylenically unsaturated monomers in the aqueous phase in the presence of free-radical initiators and emulsifiers, protective colloids or other stabilizers. The reaction components may be introduced into the emulsion polymerization in a variety of ways. When polymer resins A according to the invention are used in emulsion polymerizations as stabilizers, their good emulsifying action renders it unnecessary, for low molecular weight surfactants and protective colloids to be present. Commonly, the aqueous phase is predominantly taken as initial charge, although the addition of some water during the reaction is possible, in the form of a solution of free-radical initiator or a monomer preemulsion. The stabilizers may be present in the initial charge or partly in the initial charge with the remainder being metered in during the polymerization.

The initial charge may contain all of the monomers, or they may be metered in in pure form or as a preemulsion in water. The free-radical initiator is usually introduced partly as initial charge and partly as an aqueous solution which is metered in. The initial charge refers to the mixture which is introduced into the reactor before bringing it to the reaction temperature, which is usually from 20° to 99° C. The polymerization most frequently is induced by thermal decomposition of the free-radical initiators or by redox systems, and may be regarded as complete after reaction of the major proportion of the monomers which can be reacted by a free-radical chain reaction. It is common in this process for from about 0.001 to 0.1% by weight of residual monomers to remain. On the other hand, if there is a relatively high content of residual monomer, the batch can be after-treated with the conventional thermal or redox-initiated free-radical initiators. Such processes and process variants are described in detail in, for example, Ullmanns, ENZYKLOPÄDIE DER TECHNISCHEN CHEMIE [Ullmann's Encyclopedia of Industrial Chemistry], 4th Edition, Verlag Chemie, Weinheim (1980), Volume 19, pages 132 ff., and in ENCYCLOPEDIA OF POLYMER SCIENCE AND ENGINEERING, Volume 6, Wiley & Sons, New York 1986, pages 1–51, the disclosures of which are incorporated herein in their entirety.

The water-insoluble polymer B can be prepared using monomers which are, at least predominantly, of low solubility in water, and which remain soluble even if the pH is altered. Low solubility is understood in the context of this invention as representing a solubility of less than 10% by weight, in particular less than 5% by weight, at 25° C. The content of monomers of low solubility should be sufficient for the emulsion polymer which is formed to be insoluble in the aqueous phase under the polymerization conditions and to be present in the form of dispersed particles. In the context of this invention, preference is given to using those mixtures whose content of low-solubility monomers is at least 70% by weight, and in particular, at least 90% by weight.

Suitable monomers may contain at least one ethylenically unsaturated group. The terms ethylenically unsaturated, vinylically unsaturated and unsaturated are used throughout this description synonymously. The person skilled in the art is aware that such monomers join together, under the conditions of suspension or emulsion polymerization in an aqueous medium, to form polymers. Examples of these monomers include vinyl compounds, styrenes and acrylates and derivatives thereof. The suitable vinyl compounds include, for example, vinyl chloride, and also vinyl esters such as vinyl acetate, vinyl propionate, the vinyl ester of Versatic acid, and also vinyl esters of fatty acids, such as vinyl laurate. Suitable styrene compounds are styrene, vinyltoluene, α-methylstyrene, ethylstyrene, isopropylstyrene, tert-butylstyrene, 2,4-dimethylstyrene, diethylstyrene, o-methyl-p-isopropylstyrene, halostyrenes such as chlorostyrene, fluorostyrene and iodostyrene, 2,4-cyanostyrene, hydroxystyrene, nitrostyrene, aminostyrene and/or phenylstyrene. Particular preference is given to styrene, vinyltoluene and α-methylstyrene. Examples of suitable acrylates are esters of acrylic acid, methacrylic acid and crotonic acid, the examples including esters containing hydroxyl functions, such as hydroxyethyl acrylate and hydroxyethyl methacrylate. It is of course also possible, in the emulsion polymerization, to polymerize mixtures of such ethylenically unsaturated monomers, provided they are suitable for copolymerization. To obtain dispersions having glass transition temperatures of more than 75° C. it is preferred to start from styrene or styrene derivatives and/or methacrylates.

Conventionally, suitable initiators useful is the present invention includes water-soluble compounds which form free radicals, for example, hydrogen peroxide, peracetic acid, perbenzoic acid and perdisulfates, for example potassium or ammonium peroxodisulfate, perphosphates, peroxycarbonates, and also hydroperoxides such as tert-butyl hydroperoxide. Examples of suitable redox catalyst systems include sodium persulfate/sodium formaldehyde sulfoxylate, cumene hydroperoxide/sodium metabisulfite, hydrogen peroxide/ascorbic acid and sulfur dioxide/ammonium persulfate. Also suitable are azo compounds such as 4,4-azobis(cyanopentanoic acid) or 2,2'-azobis(2-methylbutyronitrile). The catalysts are used in conventional, catalytically active concentrations. These concentrations are in general between 0.01 and 4.0% by weight, based on the dispersion. It also is possible, optionally, to employ regulators such as, for example, sulfur compounds in order to control the molecular weight of polymer B.

In particular embodiments, other components which are conventional for emulsion polymerization can be used. Examples of these are accelerators, buffers and any other components which can be used, in addition to the stabilizers according to the invention, in the emulsion polymerization reaction mixture and which are known in the prior art in the context of emulsion polymerization processes. Suitable additional components include, for example, $Fe^{2+}$ salts, which bring about an acceleration in the formation of radicals by flee-radical initiators, for example, in combination with sodium formaldehyde sulfoxylates, or salts which act as buffers, for example phosphates, carbonates and citrates, which can be used to stabilize the pH. Up to 3% by weight of such additives may be present in the dispersion.

The present invention also relates to the use of the polymer systems in printing inks. By means of the synthesis of the polymer systems according to the invention, it is possible, in particular, to obtain polymer mixtures having the high glass transition temperature and high pigment wettability which are necessary for application in the printing sector. The invention also relates to the use of the polymer mixtures according to the invention as grinding resins and grinding dispersions for pigment pastes and, in the form of resins and dispersions, as the principal binder for water-based printing inks.

When the polymer mixtures according to the invention are used as resins in water-based inks, the polymer mixtures act as components for the fine adjustment of the aqueous printing ink systems, for example, in gloss resins for overprinting varnishes for the printing of paper, card, cardboard packages and the like. Printing of these items can be effected, for example, with the inking unit of a sheet-fed or web-fed offset press, from damping units, separate coating units of sheet-fed or web-fed offset printing presses, sheet varnishing machines, and intaglio and flexographic printing presses. When the resin solutions and dispersions according to the invention are used as binder vehicles for printing inks, their solids content is in general from 5 to 85% by weight. These inks contain from 1 to 70% by weight of dispersions according to the invention and/or from 1 to 40% by weight of solid resins according to the invention, as well as from 0 to 60% by weight of glycols or glycol ethers, from 0 to 30% by weight of wetting agents, from 0 to 35% by weight of neutralizing agents (acids), from 0 to 30% by weight of natural and/or synthetic waxes, from 0 to 2.5% by weight of antifoams, from 0 to 80% by weight of water and from 0 to 60% by weight of pigments.

For grinding operations the pigment/binder ratio typically is between 95 and 95:5, and preferably from 30:70 to 70:30. When used as pigment grinding components, the solids content of the resin can advantageously be more than 30% by weight. Mixtures of different types of dispersions or resin solutions are also advantageous for the composition of these ink bases, grinding pastes and printing inks. For the incorporation of pigments (for example titanium dioxide, colored pigments, synthetic carbon blacks), fillers (for example talc, china clay, waxes), dyes and leveling agents into the solutions and/or dispersions and/or mixtures thereof and/or diluted forms thereof, it is possible to employ the milling, mixing, kneading and grinding apparatus which is generally conventional, optionally in the presence of conventional dispersion assistants and aids.

The resins according to the invention can be used to produce pigment pastes, gloss resin solutions and dispersions having excellent printing characteristics, good storage stability, high gloss and tinctorial strength, and outstanding deinkability.

In principle, the pigment pastes may contain all pigments which are suitable for printing processes, pigments with a polyether coating are preferably employed, and may in addition to the pigments also contain other conventional additives, for example plasticizers, fillers and wetting agents. Those skilled in the art are capable of using the claimed polymer systems or polymer mixtures described herein as printing inks, grinding resins, pigment pastes, etc. in accordance with the guidelines provided herein.

The examples which follow illustrate the preparation of suitable resins which can be used in accordance with the invention, the preparation of stable polymer dispersions by emulsion polymerization, and the use of these resins and polymer dispersions in, for example, printing inks.

EXAMPLES

In the examples, parts and percentages are by weight unless otherwise stated. All reactions are carried out under a protective gas ($N_2$).

Example 1

Preparation of a styrenated phenol

Oxalic acid dihydrate (2.2 g) and boric acid (1.2 g) were added to commercially available bisphenol A (228 g) and the mixture was heated to 120° C. Styrene (104 g) was metered into this mixture such that the temperature of the reaction mixture was maintained, without further heating, at between 120° C. and 160° C. (maximum temperature). The mixture was subsequently maintained for about two hours at 160° C. by heating, the degree of reaction being monitored by determination of the solids content.

Example 2

Preparation of a styrenated phenol

A mixture of commercially available bisphenol A (117 g) and styrene (53 g) was first heated to 90° C. with stirring and then, after addition of oxalic acid dihydrate (0.23 g) and boric acid (0.11 g), was heated to 120° C. This mixture then was stirred for about 3 additional hours more at 120° C., during which the degree of reaction was monitored by determination of the solids content.

Example 3

Preparation of a styrenated phenol

Oxalic acid dihydrate (2.2 g) and boric acid (1.15 g) were added to commercially available bisphenol A (228 g) and the mixture was heated to 120° C. Styrene (104 g) and ®Veova 10 (Shell Chemie, Versatic acid vinyl ester) (198 g) were metered into this mixture such that the temperature of the reaction mixture was maintained, without further heating, at between 120° C. and 160° C. (maximum temperature). The mixture was then maintained at 160° C. for about two hours more, by heating, during which the degree of reaction was monitored by determination of the solids content.

Example 4

Preparation of a polymer A

The reaction product of Example 1 (181 g), diethanolamine (19 g), cyclohexylamine (18 g), dimethylaminopropylamine (83 g) and methoxypropanol (225 g) were mixed and heated to 80° C. A mixture of a polyglycidyl ether based on bisphenol A, having an epoxide equivalent weight of from about 180 to 192 (®Beckopox EP 140, Hoechst) (544 g) and a polypropylene glycol diglycidyl ether (®Denacol EX-920, Nagase Chemicals) (55.1 g) was metered into this mixture over the course of 30 minutes. The temperature rose to 130° C. and was then maintained for about 3 additional hours. At the end of the reaction the epoxide content was zero. The resulting polymer A had the following properties:

$M_w$: 10,700

$T_g$ (polymer A): 72° C.

Amine number: 104

Example 5

Preparation of a polymer A

A commercially available bisphenol A (124 g), diethanolamine (19 g), cyclohexylamine (18 g), dimethylaminopropylamine (83 g) and methoxypropanol (225 g) were mixed and heated to 80° C. A mixture of a polyglycidyl ether based on bisphenol A, having an epoxide equivalent weight of from about 180 to 192 (®Beckopox EP 140) (544 g) and a polypropylene glycol diglycidyl ether (®Denacol EX-920) (55.1 g) was metered into this mixture over the course of 30 minutes. The temperature rose to 130° C. and was then maintained for about 3 additional hours. The epoxide content at the end of the reaction was zero and the polymer had the following properties.

$M_w$ 10,000

$T_g$ (polymer A): 70° C.

Amine number: 106

Example 6

Preparation of a polymer A

The reaction product of Example 1 (207 g), dodecylamine (115 g), dimethylaminopropylamine (64 g) and methoxypropanol (240 g) were mixed and heated to about 100° C., and a polyglycidyl ether based on bisphenol A, having an epoxide equivalent weight of from about 180 to 192 (®Beckopox EP 140) (575 g) was metered into this mixture over the course of about 60 minutes. When the addition was complete, the temperature was raised to 130° C. and then maintained for about 3 additional hours. The epoxide content at the end of the reaction was zero and the polymer had the following properties.

$M_w$: 3500

$T_g$ (polymer A): 54° C.

Amine number: 101

Example 7

Preparation of a polymer A

Commercially available bisphenol A (158 g), dodecylamine (129 g), dimethylaminopropylamine (71 g) and methoxypropanol (250 g) were mixed and heated to about 100° C. A polyglycidyl ether based on bisphenol A, having an epoxide equivalent weight of from about 180 to 192 (®Beckopox EP 140) (642 g) was metered into this mixture over the course of about 60 minutes. When the addition was complete the temperature was raised to 130° C. and then maintained for about 3 additional hours. The epoxide content at the end of the reaction was zero and the polymer had the following properties.

$M_z$: 3500

$T_g$ (polymer A): 52° C.

Amine number: 103

Example 8

Preparation of a polymer mixture A

A commercial epoxy material (Beckopox EP 301) (182 g) was melted and reacted at 120° C. with 43 g of diethanolamine. About 60 minutes later, an additional 447 g of epoxy material (Beckopox EP 301) and then, in succession, 53 g of diethanolamine and 26 g of dimethylaminopropylamine were added and the temperature was raised to about 150° C. Stirring was carried out for 2 additional hours at 150° C. The volatile components were then removed in vacuo. The resin melt was either isolated directly or diluted with 1534 g of water and 52 g of formic acid and stirred at 90° C. to form a clear solution.

Example 9

Preparation of a polymer mixture A (A1+A2)

About 10 mol% of the epoxy groups of the epoxy materials of Example 8 were reacted at about 120° C. with $CO_2$. About 10 mol% of the amount of diethanolamine employed in Example 8 were replaced by an equimolar amount of dimethylaminopropylamine. The remainder of the preparation procedure was the same as that described in Example 8.

Example 10

Polymer system of A and B

A 35% strength resin solution was prepared by heating 88 g of the resin of Example 8 in 197 g of water and 17 g of dimethylolpropionic acid to 90° C. By the parallel metering of 176 g of styrene and of a solution of 1 g of ammonium peroxodisulfate in 100 g of water into this solution, a latex was formed. A redox system was added to remove the residual monomer, after which a highly transparent dispersion was obtained having a solids content of about 48%, a pH of 5.4 and a viscosity of 20 mPa.s.

Example 11

Grinding/gloss paste

The reaction product from Example 6 (150 g) was heated to about 80° C., water (224 g) and lactic acid (19.7 g) were added over the course of about 30 minutes, and the mixture was stirred to form a substantially clear solution. A grinding paste was obtained having a solids content of about 37%, a pH of 5.1 and a viscosity (according to Ubbelohde) of about 320 mPa.s at 23° C. The degree of neutralization of the polymer A was about 80%.

Example 12

Grinding/gloss paste

The reaction product from Example 7 (150 g) was heated to about 80° C., water (224 g) and lactic acid (20.3 g) were added over the course of about 30 minutes, and the mixture was stirred to form a substantially clear solution. A grinding paste was obtained having a solids content of about 37%, a pH of 5.5 and a viscosity (according to Ubbelohde) of about 150 mPa.s at 23° C.

The degree of neutralization of the polymer A was about 80%.

Example 13

Polymer system of A and B

The reaction product from Example 4 (125 g) was heated to about 80° C., water (137 g) and formic acid (8 g) were added over the course of 30 minutes, and the mixture was stirred to form a clear solution. At 90° C., styrene (200 g) and, in parallel therewith, ammonium peroxodisulfate (1 g) in water (292 g) were then metered in over the course of about 3 hours. In this way a dispersion was obtained which had a solids content of 41.5%, a pH of about 5.5 and a viscosity (according to Ubbelohde) of about 17 mPa.s at 23° C. and had the following properties.

$M_w$: 450,000

$T_g$: 102° C.

Example 14

Polymer system of A and B

The reaction product from Example 4 (125 g) was heated to about 80° C., water (161 g) and dimethylolpropionic acid (24 g) were added over the course of 30 minutes, and the mixture was stirred to form a clear solution. At 90° C., styrene (200 g) and, in parallel therewith, ammonium peroxodisulfate (1 g) in water (292 g) were then metered in over the course of about 3 hours. In this way a dispersion was obtained which had a solids content of about 42%, a pH of about 5.8 and a viscosity (according to Ubbelohde) of about 17 mPa.s at 23° C. and which had the following properties.

$M_w$: 430,000

$T_g$: 108° C.

Example 15

Preparation of an overprint varnish

The gloss paste from Example 11 (30 g) was mixed homogeneously with the dispersion from Example 13 (65 g) and butylglycol (2 g). After adjustment to print viscosity using water (efflux time about 16 s in the 4 mm DIN cup at 23° C.) an overprint varnish for high-gloss films was obtained.

Example 16

Preparation of an overprint varnish

The dispersion from Example 10 and the resin from Example 8, in the form of a 40% strength solution in water/dimethylolpropionic acid (degree of neutralization 80%) were mixed thoroughly in a ratio of from 1:1 to 2:1 with about 1.5% of butyldiglycol for 1 hour. After adjustment to print viscosity with water, an overprint varnish for high-gloss films was obtained.

Example 17

Preparation of a blue pigment paste (ink base)

The grinding paste from Example 11 (55 g) was mixed intensively with ®Heliogen Blue D7099AQ (BASF) (32 g) and water (31 g) in a conventional grinding apparatus. A pigment paste was obtained which had a solids content of 35% and an efflux time of about 60 s in the 4 mm DIN cup at 23° C.

Example 18

Preparation of a blue pigment paste (ink base)

The grinding paste from Example 12 (69 g) was mixed intensively with Heliogen Blue D7099AQ (30 g) and water (49 g) in a conventional grinding apparatus. A pigment paste was obtained which had a solids content of 35% and an efflux time of about 38 s in the 4 mm DIN cup at 23° C.

Example 19

Preparation of a pigmented printing ink

The pigment paste from Example 17 (11 g) was homogeneously mixed with the dispersion from Example 13 (30 g). In this way, a printing ink was obtained having a solids content of about 34%.

Example 20

Preparation of a yellow pigment paste (ink base)

The resin from Example 8 (117 parts, 25% in water/dimethylolpropionic acid, degree of neutralization 80%) and 25 parts of ®Paliotol Yellow D 1155 (BASF) were dispersed for 30 minutes at room temperature in a paint shaker (glass beads 3–4 mm).

Example 21

Preparation of a pigmented printing ink

The yellow ink base (100 parts) and 100 parts of the dispersion from Example 10 were mixed and adjusted with water to a pigment content of 6%. In this way a printing ink was obtained having an efflux time of 48–53 s (DIN flow cup 3 mm/23° C.).

The results of the foregoing examples are summarized in Table 1 below.

TABLE 1

Effect of the binder on the properties of printing inks

| Gloss paste | Pigment paste | Dispersion | Printing Ink | Gloss[a] (%) | Water resistance[b] | Drying[c] |
|---|---|---|---|---|---|---|
| Ex. 11 | | Ex. 13 | Ex. 15 | 85 | 1–2 | 2 |
| Ex. 11 | | Ex. 14 | as Ex. 15 | 81 | 1–2 | 1–2 |
| Ex. 12 | | Ex. 13 | as Ex. 15 | 64 | 2 | 2 |
| Ex. 12 | | Ex. 14 | as Ex. 15 | 72 | 2 | 3 |
| Ex. 8 | | Ex. 10 | Ex. 16 | 79 | 2–3 | 2 |
| | Ex. 17 | Ex. 13 | Ex. 19 | 56 | 1–2 | 2 |
| | Ex. 17 | Ex. 14 | as Ex. 19 | 61 | 1–2 | 2–3 |
| | Ex. 18 | Ex. 13 | as Ex. 19 | 55 | 2–3 | 2–3 |
| | Ex. 18 | Ex. 14 | as Ex. 19 | 42 | 2 | 3 |
| | Ex. 20 | Ex. 10 | Ex. 21 | 60 | 2–3 | 2–3 |

[a] 12 μm coatings on glazed paper (intrinsic gloss 32), measured with an RL reflectometer (Dr. Lange) at an angle of 60°
[b] 2 s after doctor-blade coating on glazed paper (23° C.)
1: no change in ink surface, wipefast after 1 minute
2: slight dulling of the coated surface, wipefast after 2 minutes
3: coated surface washes off, wipefast after 5 minutes
4: complete removal of the coating, wipefast after 10 minutes
[c] 2 × 24 μm coatings, measured with a ®Synres blocking tester (from Technoglas, Voorhout, Holland) at 23° C.
1: dry and tack-free after less than 1 minute
2: dry and tack-free after less than 2 minutes
3: dry and tack-free after less than 3 minutes
4: dry and tack-free after less than 4 minutes

What is claimed is:

1. An amino-containing polymer system comprising an amino-containing polymer or polymer mixture A having a glass transition temperature of at least 40° C., a weight-average molecular weight of 2,000–75,000 and an amine number of 50–300, said amino-containing polymer or polymer mixture being prepared by the reaction of
    (a) at least one epoxide, carbonate, and epoxide-carbonate,
    (b) at least one amine and
    (c) at least one phenol,
in such a manner that the polymer or polymer mixture A is free of unreacted phenol groups, 1,2-epoxy groups, 2-oxo-1,3-dioxolane and free primary or secondary amino groups, and wherein the polymer or polymer mixture A is subsequently subjected to at least partial neutralizaiton and transfer to water.

2. The polymer system as claimed in claim 1, wherein the polymer or polymer mixture A has a glass transition temperature of at least 70° C.

3. The polymer system as claimed in claim 1, wherein the polymer or polymer mixture A has a weight-average molecular weight of 5,000–25,000.

4. The polymer system as claimed in claim 1, wherein the polymer or polymer mixture A has an amine number of 90–180.

5. The polymer system as claimed in claim 1, which contains an amino-containing polymer mixture A comprising at least two amino-containing polymers A1 and A2.

6. The polymer system as claimed in claim 5, wherein the amino-containing polymers A1 and A2 have different average molecular weights.

7. The polymer system as claimed in claim 5, wherein the weight ratio of the amino-containing polymers A1 to the amino-containing polymers A2 is from 95:5 to 5:95.

8. A method for preparing a polymer system as claimed in claim 1, comprising
    (i) synthesizing an amino-containing polymer or polymer mixture A in bulk or in the presence of an organic solvent, by reacting
        (a) at least one epoxide, carbonate and epoxide-carbonate,
        (b) at least one amine and
        (c) at least one phenol, in such a manner that the polymer or polymer mixture A is free of unreacted phenol groups, 1,2-epoxy groups, 2-oxo-1,3-dioxolane and free primary or secondary amino groups,
    (ii) neutralizing the resulting polymer or polymer mixture A to the extent of at least 35%, and
    (iii) transferring said neutralized polymer or polymer mixture A to water.

9. The process as claimed in claim 8, wherein the polymer mixture is prepared by preparing at least one amino-containing polymer A2 in the presence of at least one amino-containing polymer A1.

10. The polymer system as claimed in claim 1, wherein the reaction of (a), (b), and (c) occurs simultaneously.

11. The process as claimed in claim 8, wherein the reaction of (a), (b), and (c) occurs simultaneously.

* * * * *